3,071,148
MOISTURE EXTRACTOR
John B. Woodmansee, What Cheer, Iowa (% Air-Matic Air Co., 6810 Hague Road, Indianapolis 26, Ind.)
Filed Sept. 6, 1960, Ser. No. 54,014
6 Claims. (Cl. 137—193)

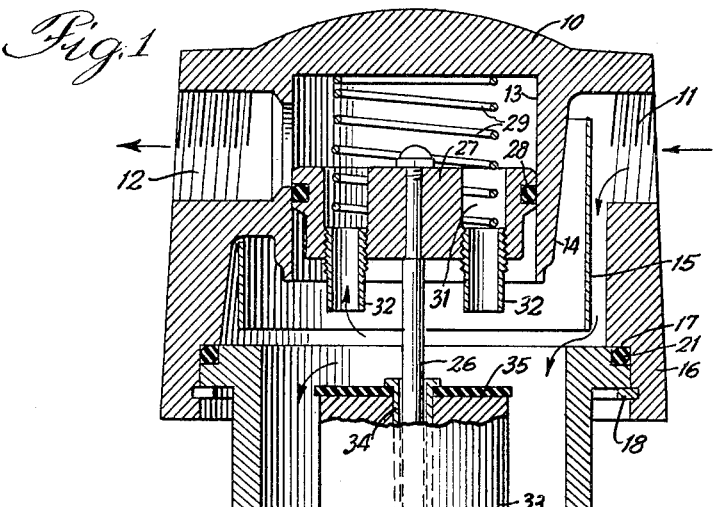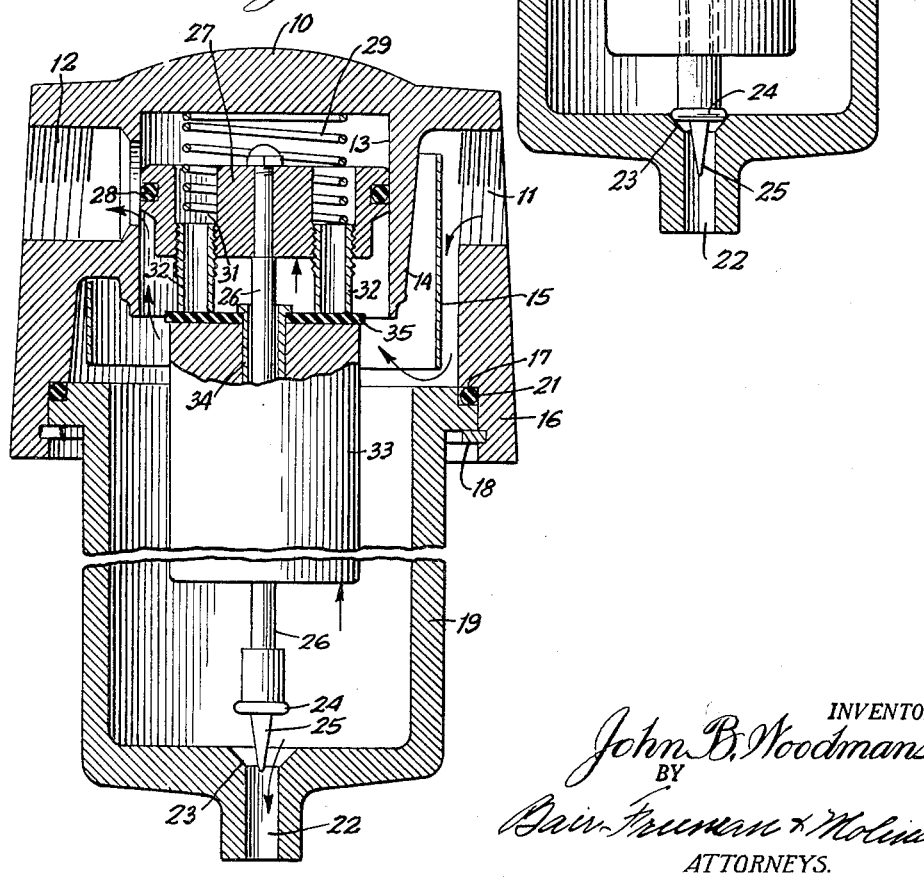

This invention relates to a moisture extractor and more particularly to apparatus for automatically removing water, oil and the like, from flowing compressed air and similar gases.

It has been the practice for many years to employ traps in compressed air lines and similar compressed gas lines to trap entrained moisture, oil, and the like, and remove it from the flowing gas stream. Such traps require periodic emptying which has heretofore been performed manually or automatically when the flow and pressure of the gas are interrupted. Emptying in either manner is not satisfactory for lines which are in continuous service and where interruptions in the flow and pressure cannot be tolerated.

It is accordingly an object of the present invention to provide a moisture extractor which operates automatically in response to the accumulation of a predetermined quantity of liquid to discharge the liquid without interrupting the flow or pressure of the gas or air.

Another object is to provide a moisture extractor in which venting of the liquid is performed in response to gas pressure under the control of a float responsive to the level of accumulated liquid so that adequate power is available to operate the venting valve and the float is unaffected by gas pressure or flow.

The above and other objects and features of the invention will be more readily apparent from the following description when read in connection with the accompanying drawing, in which:

FIGURE 1 is a sectional view of a moisture extractor embodying the invention; and FIGURE 2 is a partial view similar to FIGURE 1 showing the parts in venting position.

The moisture extractor, as shown, comprises an upper housing body, indicated generally at 10, formed with an inlet opening for compressed air or gas 11 and a discharge opening 12. The openings 11 and 12 are adapted to be connected in a line for the compressed air or gas and in accordance with the present invention may be permanently installed since it will be extremely rare, if ever necessary, to remove the upper body 10 for replacement or servicing. The upper body 10 is of generally inverted cup shape and includes a central vertical bore 13 which is defined in part by a depending skirt 14 spaced from and in registry with the inlet opening 11. The inlet opening 11 communicates with the space around and beneath the skirt 14 so that gas entering the inlet opening will flow around and below the vertical bore 13. Preferably an arcuate baffle plate 15 is provided in the body opposite to the inlet opening 11 to break up strong gas currents and to diffuse the gas smoothly into the space beneath the bore 13. The discharge opening 12, as shown, opens into the upper part of the bore 13.

The upper body 10 terminates at its bottom in an annular open wall portion 16 which is preferably recessed at its lower end to define an offset shoulder 17 with an annular groove below the shoulder to receive a split locking ring 18. A lower sump section 19, which is also cup-shaped, fits into the offset wall portion 16 and is held in place therein in properly assembled position by the split ring 18. An annular sealing member 21, such as an O-ring, is preferably provided between the upper body and the lower sump portion to form a fluid type seal therebetween. In its bottom the sump portion 19 is formed with a liquid discharge opening 22 terminating at its upper end in a valve seat 23.

To control the flow of liquid through the discharge opening 22 a valve 24 is provided having an elongated tapered lower projecting end 25 and carried by a vertically extending stem 26. The stem 26 is secured at its upper end to a piston 27 fitting slidably in the bore 13 and preferably carrying an annular sealing ring 28 to seal against leakage therebetween. The piston 27 is normally urged downward by a spring 29 which preferably extends into an annular recess 31 is the upper face of the piston and is adapted to be urged upward by gas pressure, as described hereinafter. In normal operation of the unit, gas entering through the inlet opening 11 flows upward through the piston through one or more openings therein, defined by downwardly projecting short tubular sections 32. In the normal position, as shown in FIGURE 1, the valve 24 is seated on the valve seat 23 and the piston is in a lowered position such that its upper edge is below the bottom of the discharge opening 12. In this position, the air or other gas will flow through the inlet opening and upwardly through the tube or tubes 32 to the space in the bore 13 above the piston and directly out the outlet opening 12.

Due to the path of flow of the air or gas through the unit and to the reduction of velocity of flow as the air or gas enters the relatively large space below the bore 13 entrained moisture, oil and other foreign material carried by the air or gas will tend to collect in the lower sump portion of the unit. Collection of liquids, such as moisture or oil, is sensed by a float 33 which is preferably annular and is supported on a tube 34 slidably surrounding the valve stem 26. At its upper end the float loosely carries a ring 35 of sealing material, such as rubber or synthetic rubber. As shown, the ring 35 is preferably secured to the float only by an outturned flange on the tube 34 so that it is loose relative to the float and can flex away from the float freely.

When sufficient moisture has accumulated in the unit to elevate the float to the level of the tube or tubes 32, the sealing ring 35 will engage and close the bottoms of these tube or tubes, as shown in FIGURE 2. This will interrupt flow between the inlet and outlet openings, creating a pressure differential across the piston which will raise the piston against the spring 29 to the position shown in FIGURE 2. In this position, the piston is elevated above the bottom of the outlet opening 12 so that the air or gas can flow upward through the lower part of the bore 13 and directly out the outlet 12 without going through the piston. Due to the fact that the gas under pressure itself furnishes the power required to elevate the piston, it will be moved upward rapidly to its extreme upper position so that flow of the air or other gas is re-established almost immediately with an imperceptible interruption therein.

When the piston moves upward it raises the valve 24 from its seat so that accumulated liquid and other foreign material is the sump is discharged through the sump discharge opening 22. This discharge will occur very rapidly since the opening 22 may be made relatively large and since the liquid in the sump is subjected to the incoming pressure of the air or other gas.

When the piston is moved up to the position shown in FIGURE 2 and flow through the discharge opening is re-established below the piston, the pressure differential across the piston will disappear and the piston will again move down under the influence of the spring 29 and of gravity to the normal position illustrated in FIGURE 1. It will be appreciated that the piston is actually in its raised position for only a very short interval of time, but this will be sufficient for all or substantially all of the liquid accumulated in the sump to be discharged. The float will therefore drop beneath the flow tubes 32 and normal operation of the unit will be resumed.

It will be seen that with the moisture extractor of the present invention, no appreciable interference with flow through the line is created and that accumulated moisture is automatically discharged periodically as required so that it cannot be re-entrained in the gas stream. Thus, by the use of the present invention moisture and other entrained material in the gas stream is effectively removed without requiring any manual intervention or any interruption in normal service.

While one embodiment of the invention has been shown and described herein, it will be understood that it is illustrative only and not to be taken as a definition of the scope of the invention, reference being had for this purpose to the appended claims.

What is claimed is:

1. A moisture extractor for a compressed gas line comprising a hollow casing formed with spaced inlet and outlet openings in its upper part, means in the upper part of the casing defining a vertical bore, the inlet opening into the space around and below the bore and the outlet opening into the upper part of the bore, a piston slidable in the bore from a lower position below the outlet opening to an upper position above the bottom of the outlet opening, the piston having a flow passage therethrough, there being a liquid discharge port in the bottom of the casing, a valve for the discharge port connected to the piston to be raised and opened thereby when the piston moves up, and a float in the casing controlling the flow passage to close it when the float rises.

2. A moisture extractor for a compressed gas line comprising a hollow casing formed with spaced inlet and outlet openings in its upper part, means in the upper part of the casing defining a vertical bore, the inlet opening into the space around and below the bore and the outlet opening into the upper part of the bore, a piston slidable in the bore from a lower position below the outlet opening to an upper position above the bottom of the outlet opening, the piston having a flow passage therethrough, there being a liquid discharge port in the bottom of the casing aligned with the axis of the piston, a vertical valve rod secured to the piston and terminating in a valve controlling the discharge port, and an annular float slidably mounted on the rod and movable upwardly on liquid accumulated in the casing to close the flow passage.

3. The moisture extractor of claim 2 in which the top of the float loosely carries an annular disc of flexible sealing material to seal against the flow passage.

4. A moisture extractor for compressed gas lines comprising an upper inverted cup shaped body defining a vertical bore closed at its top, there being an inlet opening in the body communicating with the space below the bore and an outlet opening communicating with the bore through a side wall thereof, a cup shaped sump secured to the body and defining therewith a closed chamber, the sump having a liquid discharge opening in its bottom, a piston slidable in the bore from a position below to a position at least partially above the outlet opening, the piston having a flow passage therethrough, a valve controlling the liquid discharge opening and connected to the piston to be operated thereby, and a float in the chamber controlling the flow passage.

5. A moisture extractor for compressed gas lines comprising an upper inverted cup shaped body defining a vertical bore closed at its top, there being an inlet opening in the body communicating with the space below the bore and an outlet opening communicating with the bore through a side wall thereof, a cup shaped sump secured to the body and defining therewith a closed chamber, the sump having a liquid discharge opening in its bottom, a piston slidable in the bore from a position below to a position at least partially above the outlet opening, the piston having a flow passage therethrough, a valve controlling the liquid discharge opening, a vertical valve rod connecting the valve to the piston, and an annular float slidable on the valve rod and movable upward on accumulated liquid in the chamber to close the flow passage.

6. The moisture extractor of claim 5 in which the flow passage includes a tubular downward extension projecting below the piston and the float has a loose annular sealing ring on its top to seal against the lower end of the extension.

References Cited in the file of this patent

UNITED STATES PATENTS

| | | |
|---|---|---|
| 670,893 | Donnelly | Mar. 26, 1901 |
| 2,629,458 | Allen | Feb. 24, 1953 |
| 2,869,570 | Wilkerson | Jan. 20, 1959 |